United States Patent
Patiño Rodriguez

(10) Patent No.: US 12,486,981 B2
(45) Date of Patent: Dec. 2, 2025

(54) CONDUIT PREHEATING CONTROL

(71) Applicant: General Electric Company, Schenectady, NY (US)

(72) Inventor: Juan Manuel Patiño Rodriguez, El Marques (MX)

(73) Assignee: General Electric Company, Schenectady, NY (US)

(*) Notice: Subject to any disclaimer, the term of this patent is extended or adjusted under 35 U.S.C. 154(b) by 518 days.

(21) Appl. No.: 18/191,510

(22) Filed: Mar. 28, 2023

(65) Prior Publication Data

US 2024/0328619 A1 Oct. 3, 2024

(51) Int. Cl.
| | |
|---|---|
| F23L 7/00 | (2006.01) |
| F01D 15/10 | (2006.01) |
| F22D 1/36 | (2006.01) |
| G05D 23/19 | (2006.01) |

(52) U.S. Cl.
CPC .......... *F23L 7/005* (2013.01); *G05D 23/1917* (2013.01)

(58) Field of Classification Search
CPC .......... F23L 7/005; F01D 19/00; F01D 25/32; F01D 17/085; F01K 17/02; F01K 13/02; G05D 23/1917; F22B 35/04; F22B 35/14; F05D 2270/303
See application file for complete search history.

(56) References Cited

U.S. PATENT DOCUMENTS

| | | | |
|---|---|---|---|
| 5,369,951 A | * | 12/1994 | Corbett ................. F01K 21/047 60/39.55 |
| 8,555,671 B2 | | 10/2013 | Lourenco et al. |
| 8,972,067 B2 | | 3/2015 | Holt et al. |
| 9,140,184 B2 | | 9/2015 | Ekanayake et al. |
| 2010/0180960 A1 | | 7/2010 | Patterson et al. |

(Continued)

FOREIGN PATENT DOCUMENTS

| | | |
|---|---|---|
| CN | 107977513 A | 5/2018 |
| CN | 108256672 A | 7/2018 |

(Continued)

OTHER PUBLICATIONS

JP2020180555 and translation (Year: 2020).*
European Search Report for corresponding EP Application No. 24161493.2-1002 dated Sep. 5, 2024, 6 pages.

*Primary Examiner* — Steven S Anderson, II
(74) *Attorney, Agent, or Firm* — James Pemrick; Charlotte Wilson; Hoffman Warnick LLC

(57) ABSTRACT

A conduit is preheated with steam having steam drain valve(s) therein open to allow draining and control valve(s) therein closed to prevent steam downstream flow. A gas may backfill the conduit from a downstream gas source to further preheat, and gas drain valve(s) may be provided to drain the gas. A predicted exit temperature of the steam or gas for a respective drain valve is calculated using a linear regression model based on initial temperature and pressure of the steam or gas and a Joule-Thompson cooling effect for the steam or gas at the respective drain valve. The preheating is stopped for the respective section of conduit when one or a combination of the predicted exit temperatures is greater than or equal to a respective required exit temperature of the steam or gas at a respective drain valve. The system sequentially ensures adequate preheating of sections of the conduit.

15 Claims, 6 Drawing Sheets

(56) References Cited

U.S. PATENT DOCUMENTS

2010/0236240 A1* 9/2010 Hu .......................... F02C 6/18
  60/670
2015/0377716 A1 12/2015 Kulkarni et al.

FOREIGN PATENT DOCUMENTS

| CN | 111695242 | A |   | 9/2020  |           |
|----|-----------|---|---|---------|-----------|
| CN | 112307650 | A |   | 2/2021  |           |
| JP | 2020180555 | A | * | 11/2020 | F01K 23/108 |
| KR | 102311857 | B1 |  | 10/2021 |           |
| WO | 2016/123356 | A1 | | 8/2016 |           |

* cited by examiner

CONDUIT PREHEATING CONTROL

TECHNICAL FIELD

The disclosure relates generally to a method and system for controlling preheating of a conduit including a multi-valve system upstream of equipment that uses the steam such as a combustor. More particularly, the disclosure relates to a method and system for controlling preheating of a conduit using exit temperature predictions of a fluid downstream of a respective drain valve in which the prediction leverages a linear regression model that considers the Joule-Thomson cooling effect experienced by the fluid flowing through the respective drain valve.

BACKGROUND

In some gas turbine engines used for electrical power generation, steam injection is provided via a steam manifold to the combustion cans of a combustor to reduce nitrous oxide (NOx) emissions and/or to supplement power generation. Conduits (i.e., piping) from the steam supply to the steam manifold are usually exposed to the ambient conditions (e.g., outdoors environment) until they reach an enclosure that surrounds the gas turbine engine. It is understood that, because of the conduit length between the steam supply and the steam manifold and because of the temperature difference between the super-heated steam and the ambient temperatures, condensate can develop in the conduit prior to engine start-up. In such systems, the conduit is provided with drain valves which evacuate the condensate, as well as one or more control valves in a main supply conduit, which collectively control the flow of steam to the steam manifold.

Preheating of the conduits can ensure that the steam is at the appropriate temperature for its intended use. In order to control the preheating, the conduit is provided with thermocouples downstream of each drain valve to detect the actual exit temperatures of fluid flowing therethrough. The control system opens control valves to deliver steam further downstream toward the combustor based on the exit temperatures at the drain valves being higher than a predetermined, required exit temperature for the preheating, i.e., operating in go/no-go stages to preheat the conduit. The control valves are opened only when the appropriate thermocouples indicate the required exit temperatures have been met. The control systems do not factor in variables that affect the accuracy of the measured exit temperatures. Further, some systems may include "safeguards" in determining the criteria for the required fluid temperature. The lack of variable consideration and the inclusion of safeguards may be overly protective to the extent that such rigid control analysis may cause the system to expend more energy and time in the preheating process than is actually required, leading to unnecessary downtime of the gas turbine engine. Adaptation of control systems and methods to consider variables and to update control systems can provide enhanced control of the conduit preheating process.

BRIEF DESCRIPTION

All aspects, examples and features mentioned below can be combined in any technically possible way.

An aspect of the disclosure sets forth a method for controlling preheating of a conduit, the method comprising: preheating the conduit by flowing a steam through the conduit to preheat the conduit with at least one control valve closed to prevent downstream steam flow and at least one steam drain valve open; determining an initial temperature and an initial pressure of the steam upstream of the at least one control valve and the at least one steam drain valve; calculating a predicted exit temperature of the steam downstream of the at least one steam drain valve using a linear regression model based on the initial temperature, the initial pressure and a Joule-Thompson cooling effect analysis of the steam at the at least one steam drain valve; and in response to the predicted exit temperature of the steam downstream of the at least one steam drain valve being greater than or equal to a required exit temperature of the steam at the at least one steam drain valve, closing the at least one steam drain valve and opening the at least one control valve to allow steam to flow downstream in the conduit; and in response to the predicted exit temperature being less than the required exit temperature of the steam at the at least one steam drain valve, continuing the preheating.

Another aspect of the disclosure includes any of the preceding aspects, and the at least one control valve includes a first control valve and a second control valve spaced from the first control valve in the conduit, and the at least one steam drain valve includes a first steam drain valve upstream of the first control valve and a second steam drain valve downstream of the first control valve and upstream of the second control valve, and wherein the closing the at least one steam drain valve and opening the at least one control valve includes closing the first steam drain valve and opening the first control valve in response to the predicted exit temperature of the steam downstream of the first steam drain valve being greater than or equal to the required exit temperature of the steam at the first steam drain valve.

Another aspect of the disclosure includes any of the preceding aspects, and the second control valve includes a stop valve.

Another aspect of the disclosure includes any of the preceding aspects, and further comprising at least one gas drain valve downstream of the second control valve, and wherein, during the preheating, a gas backfills the conduit from a downstream gas source to the second control valve and drains from the at least one gas drain valve, and further comprising calculating a predicted exit temperature of the gas downstream of the at least one gas drain valve using the linear regression model based on the initial temperature, the initial pressure and a Joule-Thompson cooling effect analysis of the gas at the at least one gas drain valve, further comprising stopping the preheating by closing the second steam drain valve and the at least one gas drain valve and opening the second control valve in response to: the predicted exit temperature of the steam downstream of the second steam drain valve being greater than the required exit temperature of the steam at the second steam drain valve; and the predicted exit temperature of the gas downstream of the at least one gas drain valve being greater than a required exit temperature of the gas at the at least one gas drain valve.

Another aspect of the disclosure includes any of the preceding aspects, and the at least one gas drain valve includes a first gas drain valve and a second gas drain valve, and the stopping the preheating occurs in response to: the predicted exit temperature of the gas downstream of the first gas drain valve being greater than a required exit temperature of the gas at the first gas drain valve, and the predicted exit temperature of the gas downstream of the second gas drain valve being greater than a required exit temperature of the gas at the second gas drain valve.

Another aspect of the disclosure includes any of the preceding aspects, and further comprising: in response to an actual exit temperature of the steam downstream of the at least one steam drain valve being less than the required exit temperature of the steam at the at least one steam drain valve, opening the at least one steam drain valve and closing the at least one control valve to prevent steam flowing downstream in the conduit.

Another aspect of the disclosure includes a system for controlling preheating of a conduit, the system comprising: a steam supply fluidly coupled to the conduit; at least one control valve in the conduit; at least one steam drain valve configured to drain steam from the conduit upstream of the at least one control valve; at least one upstream thermocouple disposed upstream of the at least one control valve and the at least one steam drain valve; and a controller configured to: preheat the conduit by flowing the steam from the steam supply through the conduit with the at least one control valve closed to prevent downstream steam flow and the at least one steam drain valve open; determine an initial temperature and an initial pressure of the steam upstream of the at least one control valve and the at least one steam drain valve using the at least one thermocouple; calculate a predicted exit temperature of the steam downstream of the at least one steam drain valve using a linear regression model based on the initial temperature, the initial pressure and a Joule-Thompson cooling effect analysis of the steam at the at least one steam drain valve; in response to the predicted exit temperature of the steam downstream of the at least one steam drain valve being greater than or equal to a required exit temperature of the steam at the at least one steam drain valve, close the at least one steam drain valve and open the at least one control valve to allow steam to flow downstream in the conduit; and in response to the predicted exit temperature being less than the required exit temperature of the steam at the at least one steam drain valve, continue the preheating.

Another aspect of the disclosure includes any of the preceding aspects, and the at least one control valve includes a first control valve and a second control valve spaced from the first control valve in the conduit, and the at least one steam drain valve includes a first steam drain valve upstream of the first control valve and a second steam drain valve downstream of the first control valve and upstream of the second control valve, and wherein the controller closes the first steam drain valve and opens the first control valve in response to the predicted exit temperature of the steam downstream of the first steam drain valve being greater than or equal to the required exit temperature of the steam at the first steam drain valve.

Another aspect of the disclosure includes any of the preceding aspects, and the second control valve includes a stop valve.

Another aspect of the disclosure includes any of the preceding aspects, and further comprising at least one gas drain valve downstream of the second control valve, and wherein, during the preheating, a gas backfills the conduit from a downstream gas source to the second control valve and drains from the at least one gas drain valve, and wherein the controller: calculates a predicted exit temperature of the gas downstream of the at least one gas drain valve using the linear regression model based on the initial temperature, the initial pressure and a Joule-Thompson cooling effect analysis of the gas at the at least one gas drain valve; and stops the preheating by closing the second steam drain valve and the at least one gas drain valve and opening the second control valve in response to: the predicted exit temperature of the steam downstream of the second steam drain valve being greater than the required exit temperature of the steam at the second steam drain valve; and the predicted exit temperature of the gas downstream of the at least one gas drain valve being greater than a required exit temperature of the gas at the at least one gas drain valve.

Another aspect of the disclosure includes any of the preceding aspects, and the at least one gas drain valve includes a first gas drain valve and a second gas drain valve, and wherein the controller stops the preheating in response to: the predicted exit temperature of the gas downstream of the first gas drain valve being greater than a required exit temperature of the gas at the first gas drain valve, and the predicted exit temperature of the gas downstream of the second gas drain valve being greater than a required exit temperature of the gas at the second gas drain valve.

Another aspect of the disclosure includes any of the preceding aspects, and further comprising a downstream thermocouple disposed downstream of the at least one steam drain valve, and wherein the controller in response to an actual exit temperature of the steam downstream of the at least one steam drain valve measured by the downstream thermocouple being less than the required exit temperature of the steam at the at least one steam drain valve, opening the at least one steam drain valve and closing the at least one control valve to prevent steam flowing downstream in the conduit.

Another aspect of the disclosure relates to a system for controlling preheating of a conduit, the system comprising: a steam supply fluidly coupled to the conduit, wherein a gas backfills the conduit from a downstream gas source; a first control valve in the conduit; a first steam drain valve configured to drain steam from the conduit upstream of the first control valve; a second control valve in the conduit downstream of the first control valve; a second steam drain valve configured to drain steam from the conduit downstream of the first control valve and upstream of the second control valve; at least one gas drain valve in the conduit downstream of the second control valve; at least one sensor upstream of the first and second control valves and the first and second steam drain valves to provide an initial temperature and an initial pressure of the steam entering the conduit; and a controller configured to: preheat the conduit by flowing the steam through the conduit with the first control valve closed to prevent downstream steam flow and the first steam drain valve open; in response to a predicted exit temperature of the steam downstream of the first steam drain valve being less than the required exit temperature of the steam at the first drain valve, continue the preheating; in response to the predicted exit temperature of the steam downstream of the first steam drain valve being greater than or equal to the required exit temperature of the steam at the first steam drain valve, close the first steam drain valve and open the first control valve to allow steam to flow downstream in the conduit, and subsequently: stop the preheating by closing the second steam drain valve and opening the second control valve in response to a predicted exit temperature of the steam downstream of the second steam drain valve being greater than the required exit temperature of the steam at the second steam drain valve, and a predicted exit temperature of the gas downstream of the at least one gas drain valve being greater than a required exit temperature of the gas at the at least one gas drain valve, and wherein each predicted exit temperature of the steam or the gas downstream of a respective drain valve is calculated using a linear regression model based on the initial temperature, the initial pressure and a Joule-Thompson cooling effect analysis of the steam or the gas at the respective drain valve.

Another aspect of the disclosure includes any of the preceding aspects, and the second control valve includes a stop valve.

Another aspect of the disclosure includes any of the preceding aspects, and the at least one gas drain valve includes a first gas drain valve and a second gas drain valve, and wherein the controller stops the preheating in response to: the predicted exit temperature of the gas downstream of the first gas drain valve being greater than the required exit temperature of the gas at the first gas drain valve, and the predicted exit temperature of the gas downstream of the second gas drain valve being greater than the required exit temperature of the gas at the second gas drain valve.

Two or more aspects described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
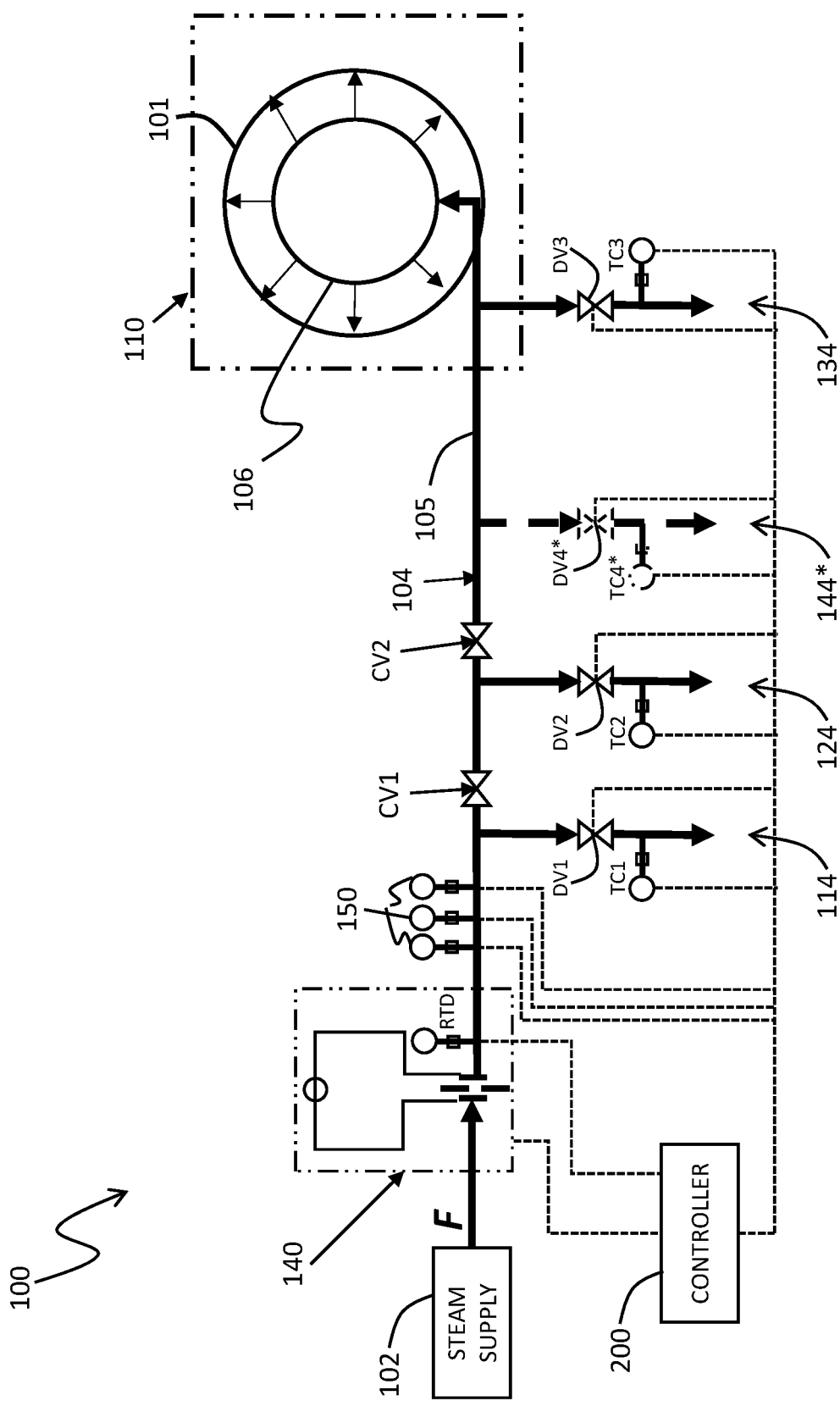
FIG. 1 shows a schematic view of a steam delivery system employing a system for preheating a conduit, according to embodiments of the disclosure.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION

As an initial matter, in order to clearly describe the current disclosure, it will become necessary to select certain terminology when referring to and describing relevant machine components within the illustrative application of a turbomachine. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as steam or another gas such as air, through a conduit or, for example, the flow of air through a combustor or coolant through one of the turbomachine's component systems. The term "downstream" corresponds to the direction of flow of the fluid, and the term "upstream" refers to the direction opposite to the flow. The terms "forward" and "aft," without any further specificity, refer to directions, with "forward" referring to the front or compressor end of the turbomachine, and "aft" referring to the rearward or turbine end of the turbomachine.

In addition, several descriptive terms may be used regularly herein, as described below. The terms "first," "second," and "third," may be used interchangeably to distinguish one component from another and are not intended to signify location or importance of the individual components.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event may or may not occur or that the subsequently described feature may or may not be present and that the description includes instances where the event occurs, or the feature is present and instances where the event does not occur, or the feature is not present.

Where an element or layer is referred to as being "on," "engaged to," "connected to," "coupled to," or "mounted to" another element or layer, it may be directly on, engaged, connected, coupled, or mounted to the other element or layer, or intervening elements or layers may be present. In contrast, when an element is referred to as being "directly on," "directly engaged to," "directly connected to," or "directly coupled to" another element or layer, there are no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items. The verb forms of "couple" and "mount" may be used interchangeably herein.

As embodied by the disclosure, a system and method are provided to control preheating of a conduit in, for example, a steam delivery system. A conduit is preheated with steam having steam drain valve(s) therein open to allow draining and control valve(s) therein closed to prevent steam downstream flow. A gas may backfill the conduit from a downstream gas source to further preheat, and gas drain valve(s) may be provided to drain the gas. A predicted exit temperature of the steam or gas for a respective drain valve is calculated using a linear regression model based on initial temperature and pressure of the steam and a Joule-Thompson cooling effect for the steam or gas at the respective drain valve. The preheating is stopped for the respective section of conduit when one or a combination of the predicted exit temperatures is greater than or equal to a respective required exit temperature of the steam or gas at a respective drain valve. The method and system may sequentially ensure adequate preheating of sections of the conduit.

Figure 2:
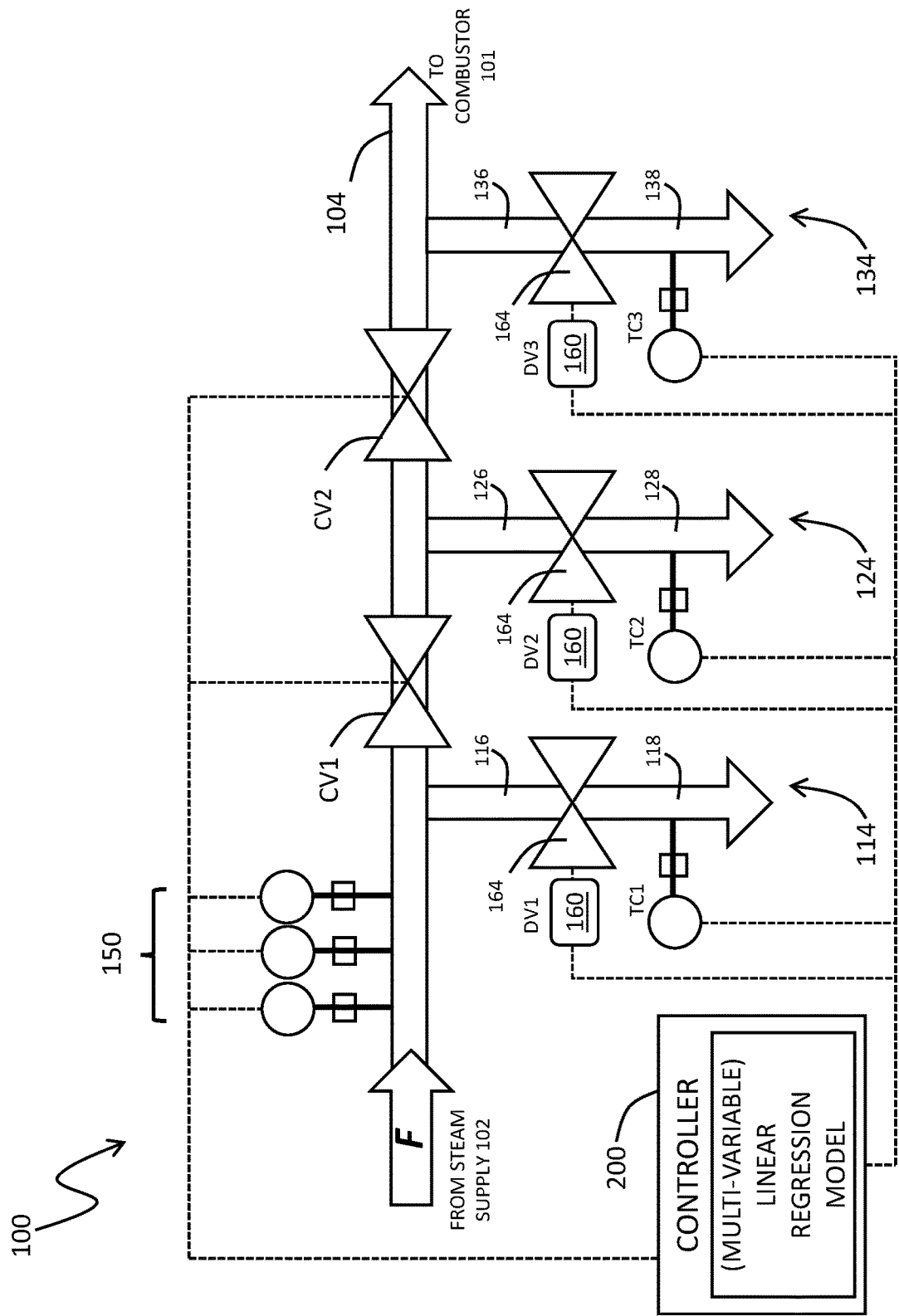
FIG. 2 shows an enlarged schematic view of portions of the system of FIG. 1, according to embodiments of the disclosure.

FIGS. 1 and 2 schematically illustrate a system 100 according to embodiments of the disclosure. For purposes of description, system 100 is illustrated for use with a steam delivery system for supplying super-heated steam to a turbomachine and, more particularly, a plurality of combustion cans (not shown) of a combustor 101 of a gas turbine engine (not shown). It is emphasized, however, system 100 can be employed in different settings than that described herein.

System 100 includes a steam supply 102, a conduit 104, and a plurality of drain conduits 114, 124, 134, and, optionally, 144 branching from conduit 104. In the example setting shown, system 100 is coupled to a steam manifold 106 located within a gas turbine (GT) enclosure 110 for delivering steam to the individual combustion cans of combustor 101. As used in this application the term "conduit" includes pipes, ducts, passageways, and other conveyances now known or hereinafter developed for constraining and directing fluid flow. As used herein, "conduit" 104 may include a main steam conduit 105 and any branches thereof, such as drain conduits 114, 124, 134 and optionally 144, that may impact the temperature of the steam therein. As noted, conduit 104 (i.e., piping) from steam supply 102 to steam manifold 106 is usually exposed to the ambient conditions (i.e., elements outdoors) until it reaches gas turbine enclosure 110 that surrounds the gas turbine engine (not shown). It is understood that, because of conduit 104 length between steam supply 102 and steam manifold 106 and because of the temperature difference between the super-heated steam and the ambient temperatures, condensate can develop in conduit 104 prior to gas turbine start-up.

Conduit 104 includes at least one drain valve DV1-DV4 which evacuate, among other things, the steam condensate, as well as at least one control valves CV1-CV2 that collectively control the flow of steam downstream in conduit 104 to, for example, steam manifold 106. More particularly, system 100 may include at least one control valve in conduit 104. For example, system 100 includes a first control valve CV1 in conduit 104 and may include a second control valve CV2 in conduit 104. First control valve CV1 is positioned upstream from second control valve CV2 (relative to the direction of steam flow "F" from steam supply 102 toward steam manifold 106 and combustor 101). Control valves CV1, CV2, etc., control whether steam flows in conduit 104.

System 100 may also include at least one drain valve DV1-DV3 and optionally DV4. More particularly, each of drain conduits 114, 124, 134, and, when present, 144 includes a respective drain valve (DV1, DV2, DV3, DV4) and a respective thermocouple (TC1, TC2, TC3, TC4). As shown in FIG. 2, each drain conduit 114, 124, 134, and optional 144, includes an upstream portion 116, 126, 136 that extends between main steam conduit 105 and respective valve DV1, DV2, DV3, and DV4 and a downstream portion 118, 128, 138 that extends between the respective valve DV1, DV2, DV3, and DV4 and a respective outlet (exit). While drain conduit 144 and drain valve DV4 are not shown in FIG. 2, it will be understood that they have similar structure as drain conduits 114, 124, 134 and drain valves DV1-DV3.

Drain valves DV1, DV2 control draining of steam from main steam conduit 105 and may be referred to herein as "steam drain valves." It will be recognized that draining "steam" may include steam at any condition and/or condensate thereof (i.e., water). Similarly, gas drain valve DV3 and, optionally, gas drain valve DV4, control exit of a gas backfilling main steam conduit 105 from a downstream gas source, e.g., a compressor coupled to combustor 101. As used herein, "backfill" or "backfilling" indicates that the gas is moving in an upstream direction opposite to steam in conduit 104 toward, for example, steam manifold 106. The gas may include, for example, compressed air perhaps with some contaminants and/or steam. In any event, the gas has a temperature high enough to heat a section of conduit 104. It will be recognized that draining "gas" may include, for example, compressed air, contaminants in the air such as fuel or exhaust fumes from combustor 101, and steam at any condition and/or condensate thereof (i.e., water). Drain valves DV3 and DV4 may be referenced herein as "gas drain valves." Steam and/or gas within the conduits described herein may also be referred to, collectively or individually, as a fluid.

Thermocouples TC1-TC4 are located in the downstream portions of drain conduits 114, 124, 134 and optional 144, and measure the actual temperature of the fluid, e.g., steam or other gas, flowing downstream of the respective drain valve DV1-DV4. In the drawings, optional drain conduit 144, thermocouple TC4 and gas drain valve DV4 may be labeled with an asterisk "*" to indicate they are optional.

First control valve CV1 and second control valve CV2 are disposed in main steam conduit 105 to control flow F therethrough in response to controller 200 providing instructions to open or close control valves CV1 and CV2. Similarly, drain valves DV1-DV4 are disposed in respective drain conduits 114, 124, 134, 144 to control flow therethrough in response to controller 200 providing instructions to open or close drain valves DV1-DV4. As shown in FIG. 2, each drain valve DV1-DV4 includes an actuator 160 and a valve body 164. Valve body 164 may include a valve seat and a valve plug (not illustrated). Control valves CV1, CV2 and drain valves DV1-DV4, as embodied by the disclosure, can include a solenoid valve, a ball valve, a butterfly valve, a diaphragm valve, a gate valve, a pinch valve, a piston valve, and a plug valve, or other appropriate valve structures now known or hereinafter developed. In certain embodiments, control valves CV1 and CV2 can modulate steam flow, i.e., with positions of open, closed and any position between fully open and fully closed. In other embodiments, second control valve CV2, which may be a downstream-most control valve in main conduit line 105, may be embodied as a stop valve with only fully open and fully closed positions.

System 100 may include a variety of sensors for steam entering conduit 104. System 100 may include a flowmeter 140 in main steam conduit 105 with internal orifice(s) and one or more pressure sensors (generically labeled "RTD"), which are in communication with a controller 200, as represented by dotted lines. One or more temperature sensors, such as main-line thermocouples 150, may also be disposed on or in main steam conduit 105 between flowmeter 140 and first control valve CV1. In the illustrated embodiment, main-line thermocouples 150 are disposed between flowmeter 140 and first drain conduit 114, which is upstream of first control valve CV1. Main-line thermocouples 150 provide temperature readings to controller 200 at various locations along main steam conduit 105.

Controller 200 includes any computerized control system that may be configured as and/or which may comprise a non-transitory computer readable storage medium that stores code providing the functions described herein. Generally, controller 200 may enable a process for controlling preheating of a conduit, i.e., main steam conduit 105 and perhaps others conduits listed herein, by predicting an exit temperature of a fluid downstream of a respective drain valve DV1-DV4 (e.g., in drain conduits 114, 124, 134, and optionally 144) for purposes of determining whether preheating of main steam conduit 105 and associated drain conduits 114, 124, 134, and 144 is complete or whether further preheating is required.

Controller 200 enables the method to read from the various sensors an initial temperature value $T_i$ and an initial pressure value $P_i$ of fluid F upstream of a given valve (e.g., first control valve CV2 or steam drain valve DV1) using thermocouple(s) 150. Controller 200 receives the initial temperature and pressure $T_i$, $P_i$ of fluid F and applies them to a linear regression model or analysis. Controller 200 calculates a predicted exit temperature of the fluid, e.g., steam or gas depending on the location of the respective drain valve, by applying the at least one linear regression model. The at least one linear regression model, as embodied by the disclosure, predicts the exit temperature based on the initial temperature $T_i$, initial pressure $P_i$ and a Joule-Thompson cooling effect analysis ("Joule-Thompson effect"). The Joule-Thompson cooling effect is a reduction in the temperature of a gas as the gas undergoes a pressure reduction under certain conditions.

In system 100, steam exiting steam drain valves DV1 or DV2, or gas exiting drain valves DV3 or DV4, undergoes a pressure reduction that can impact the steam or other gas' exit temperature in a manner that can negatively impact the preheating of conduit 104. As will be described, consideration of the Joule-Thompson cooling effect by system 100 allows the preheating to be extended to address any temperature reduction impact on the preheating, reducing the downtime of the gas turbine. As will be further described, the linear regression model considering the Joule-Thompson cooling effect can be applied to predict exit temperatures based on pressure reductions experienced by steam exiting steam drain valves DV1 or DV2 and/or gas exiting drain valves DV3 or DV4.

In certain aspects of the embodiments, the at least one linear regression model is defined by the equation:

$$T_E = a_0 P_i^{a_1} T_i^{a_2}$$

where $T_E$ is the predicted exit temperature of a fluid at the exit of a respective valve (e.g., outlet of steam drain valve DV1); $P_i$ is the initial pressure value upstream of first control valve CV1 and/or steam drain valve DV1; $T_i$ is the initial temperature value upstream of first control valve CV1 and/or steam drain valve DV1; and $a_0$, $a_1$, and $a_2$ are constants.

In certain aspects of the embodiments, the at least one linear regression model includes multivariable linear regression models, which are applied by controller 200. Further, an aspect of controller 200 may employ multivariable linear regression models that apply the Joule-Thompson effect analysis. Thermodynamic calculations along with steam/air tables are used to calculate constants $a_0$, $a_1$, and $a_2$ based on upstream steam/gas pressure and temperature.

Controller 200 can update the linear regression model(s) based on, among other things, whether the predicted exit temperature $T_E$ is greater than the required exit temperature $T_R$ of the particular fluid (e.g., steam or other gas) downstream of respective drain valve DV1-DV4, and/or whether the predicted exit temperature $T_E$ is greater than the actual exit temperature (as measured by thermocouples TC1-TC4) of the particular fluid downstream of respective drain valve DV1-DV4. The updating may also include changing the constants $a_0$, $a_1$, $a_2$, based on readings from thermocouples 150 and comparison against predicted exit temperature $T_E$, thereby improving the linear regression model(s) accuracy.

As will be described, controller 200 can determine whether an exit temperature at a respective drain valve is greater than or equal to a required exit temperature at the respective drain valve. As used herein, "required exit temperature" is the temperature of the fluid, i.e., steam or other gas, at the exit of the particular drain valve that indicates sufficient preheating of the section of conduit 104 upstream of the respective drain valve. The required exit temperature may be based, for example, on a temperature known to sufficiently reduce or prevent condensation in conduit 104 at the particular location (based on conduit material, size, length, and type of fluid, among other possible options). In another example, the required exit temperature can be based on the desired temperature of the steam for steam manifold 106. The required exit temperature may also be known based on empirical data and/or thermal modeling, among other options. The required exit temperature may be different at each drain valve DV1-DV4, i.e., each drain valve may have its own required exit temperature.

With regard to labeling of the temperatures herein, the predicted exit temperatures are denoted generically as $T_E$, those for steam are denoted $T_{ES}$, and those for gas are denoted $T_{EG}$. As will be further described, a required exit temperature is denoted generically as $T_R$, those for steam are denoted $T_{RS}$, and those for gas are denoted $T_{RG}$. A measured exit temperature is denoted $T_{TC}$ and may be used for a steam or gas flow.

A measured exit temperature $T_{TC}$ may be provided by a thermocouple TC1 disposed in downstream portion 118 of drain conduit 114 (similarly, by TC2 in downstream portion 128 of drain conduit 124, and by TC3 in downstream portion 138 of drain conduit 134). Similar structure is provided for drain conduit 144 (FIG. 1), when provided. Measured actual exit temperature $T_{TC}$ from each thermocouple (e.g., TC1) is provided to controller 200. As will be described, the measured exit temperatures can be used to confirm the fluid's actual exit temperature is above a required exit temperature $T_R$ at a respective drain valve.

In the illustrative application, the preheating system for a steam delivery system is applied to turbomachinery, where the fluid can include steam generated by the turbomachinery or being applied to the turbomachinery. For example, turbomachinery can be connected to main steam conduit 105, once first control valve CV1 and second control valve CV2 are opened and drain valves D1-D4 are closed. Such actions occur when controller 200 determines that the superheated steam flow F is at the appropriate temperature, i.e., as will be described, when the predicted exit temperature(s) $T_E$ for drain valve(s) DV1-DV4 is greater than the required exit temperature $T_R$ at the respective drain valve. In the illustrative embodiment of FIG. 1, main steam conduit 105 delivers steam to a steam injection manifold 106 within a gas turbine enclosure 110 for delivering steam to a plurality of combustion cans of combustor 101 for power augmentation. In other aspects, the steam is capable of being applied to a variety of other downstream equipment such as at least one of: another part of a combined cycle power plant; an emissions controller; and a heat recovery steam generator. System 100 may be applied to any turbomachine equipped with the system.

Figure 3A:
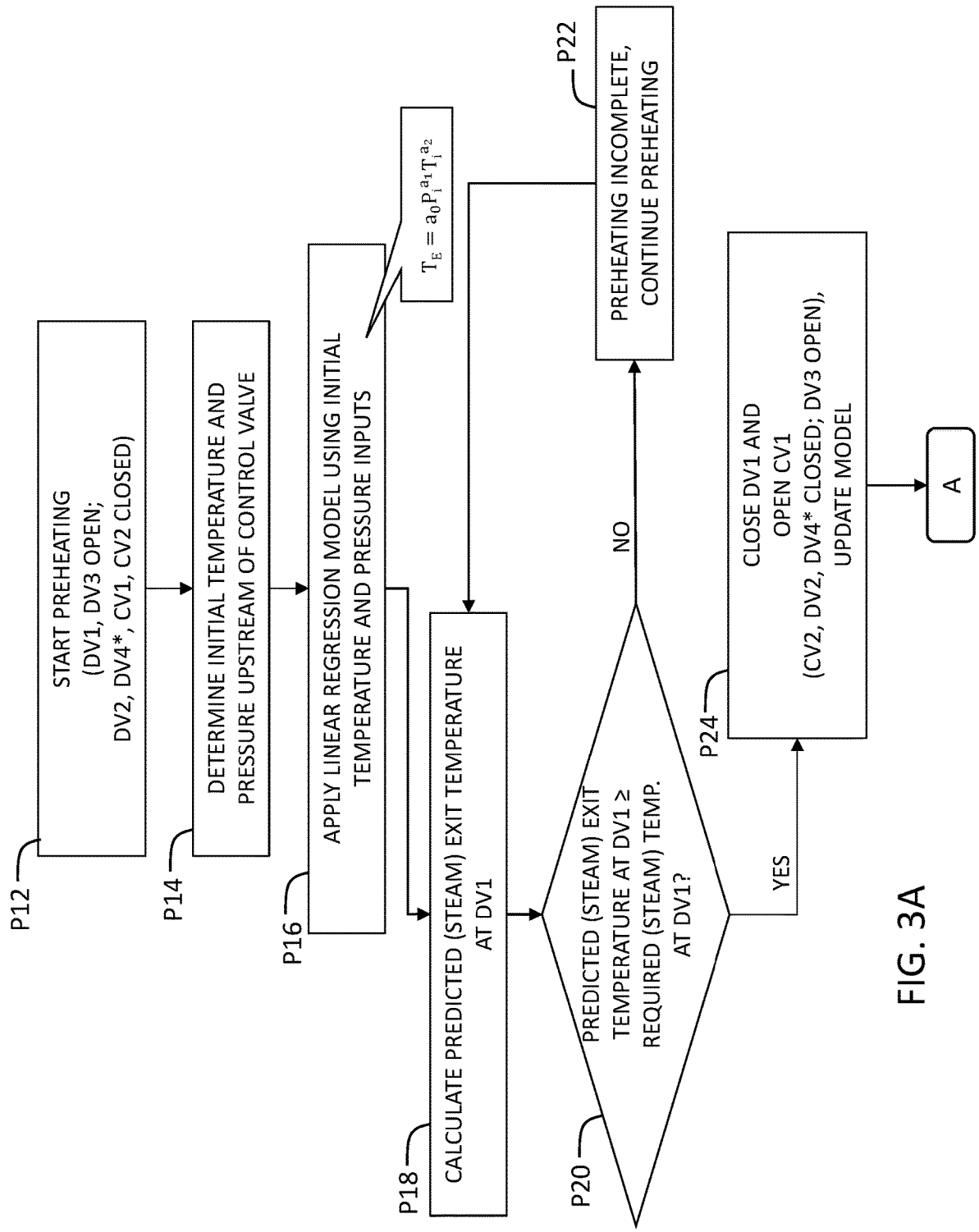
FIGS. 3A-C show flow diagrams of a control method, according to various embodiments of the disclosure.
Figure 3B:
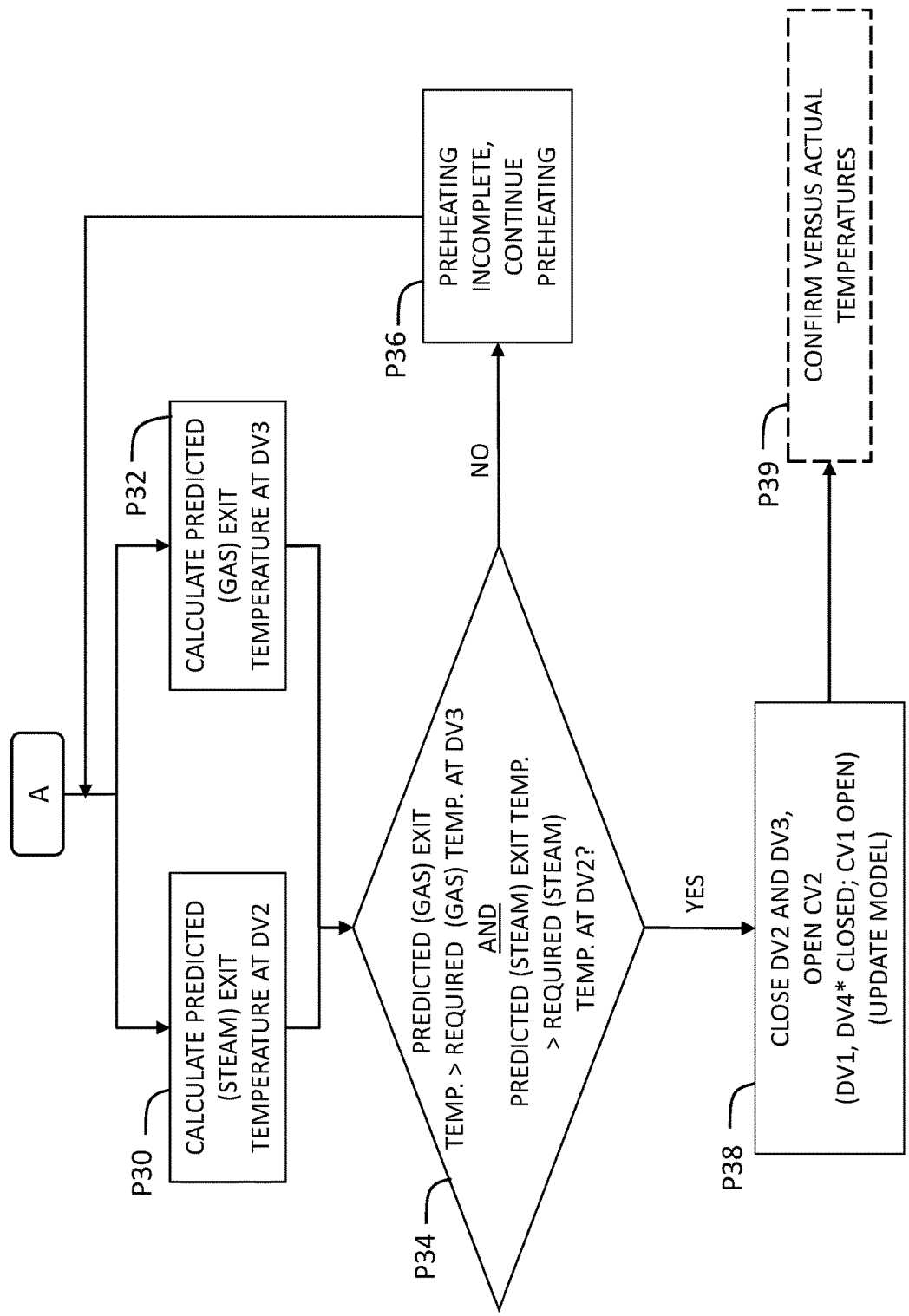
Figure 3C:
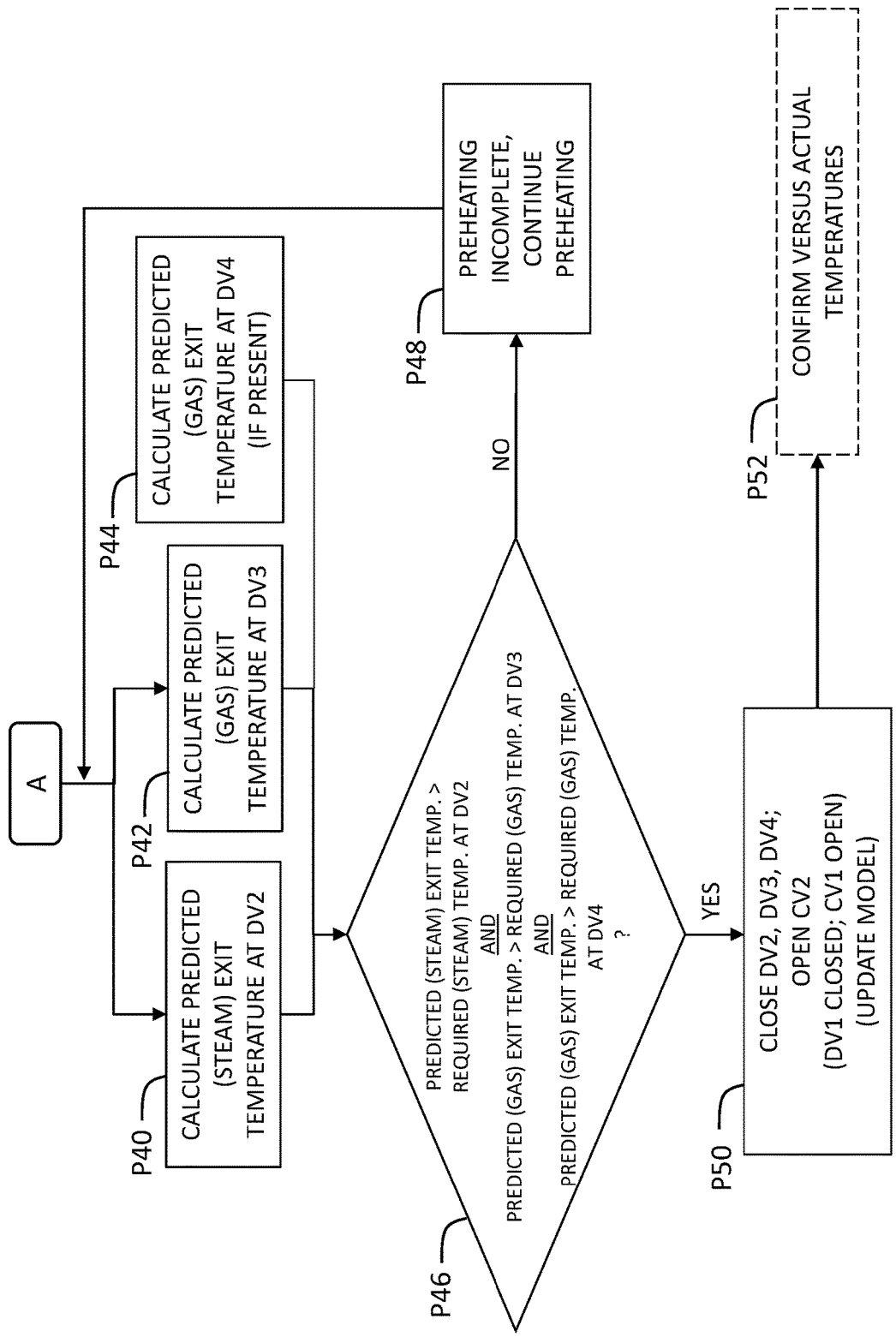

Referring to FIGS. 3A-C, flow diagrams of embodiments of a method for controlling preheating of a conduit, e.g., main steam conduit 105 among other conduits in system 100, will now be described. Controller 200 of system 100 may include code to perform the method described herein.

The code is configured to perform the steps/processes described herein and can update variables in the at least one linear regression model in controller 200.

Referring to FIG. 3A, in process P12, controller 200 starts preheating of conduit 104 by flowing a steam (flow F) through conduit 104 to preheat conduit 104 with at least one control valve CV1 closed to prevent steam downstream flow, e.g., to steam manifold 106 and/or combustor 101, and at least one steam drain valve, e.g., DV1, open. In one example, steam drain valve DV1 is open, steam drain valve DV2 is closed, and one of gas drain valves DV3 (and DV4 if provided) is open, and both control valves CV1, CV2 are closed. In this case, any condensate from steam drains through first steam drain valve DV1, and any gas or condensate from gas backfilling conduit 104 from combustor 101 drains from gas drain valve DV3 (and perhaps DV4, if provided). In any event, steam and (hot) gas flows heat section(s) of conduit 104 through which they are conveyed.

In process P14, controller 200 determines an initial temperature $T_i$ and an initial pressure $P_i$ of the steam upstream of at least one control valve, e.g., CV1, and the at least one steam drain valve, e.g., DV1. As shown in FIG. 1, initial temperature $T_i$ can be obtained from any one of thermocouples 150, and initial pressure $P_i$ can be obtained from one or more pressure sensors RTD.

In process P16, controller 200 applies the linear regression model using initial temperature $T_i$ and initial pressure $P_i$ inputs. The linear regression model uses initial temperature $T_i$, initial pressure $P_i$ and a Joule-Thompson cooling effect analysis of the steam at the at least one steam drain valve, e.g., DV1, to predict exit temperatures at the steam drain valve(s) DV1 (and perhaps DV2). The Joule-Thompson cooling effect is a reduction in the temperature of a pressurized gas as the gas undergoes a pressure reduction under certain conditions. In system 100, steam exiting steam drain valves DV1 or DV2, or gas exiting drain valves DV3 or DV4, undergoes a pressure reduction that can impact the steam (or other gas) exit temperature in a manner that can negatively affect the preheating of conduit 104. For example, preheating may occur for a longer duration of time than is needed, thus expending more energy than is needed. As will be described, consideration of the Joule-Thompson cooling effect by system 100 allows the preheating to be of appropriate duration to address any temperature reduction impact on the preheating, reducing the downtime of the gas turbine. As will be further described, the linear regression model considering the Joule-Thompson cooling effect can be applied to predict exit temperatures due to pressure reductions experienced by steam exiting steam drain valves DV1 or DV2 and/or gas exiting drain valves DV3 or DV4.

In process P18, controller 200 calculates a predicted exit temperature at the at least one steam drain valve, e.g., DV1, using the linear regression model based on initial temperature $T_i$, initial pressure $P_i$ and the Joule-Thompson cooling effect analysis of the steam at the at least one steam drain valve, e.g., DV1. Controller 200 may also calculate a predicted exit temperature at more than one steam drain valve, e.g., DV1, DV2, etc., using the linear regression model based on initial temperature $T_i$, initial pressure $P_i$ and the Joule-Thompson cooling effect analysis of the steam at the respective steam drain valve(s), e.g., DV1, DV2, etc.

In process P20, controller 200 determines whether predicted exit temperature $T_{ES}$ of the steam downstream of the at least one steam drain valve, e.g., DV1, is greater than or equal to ($\geq$) a required exit temperature $T_{RS}$ of the steam at the at least one steam drain valve, e.g., DV1.

In process P22, in response to the predicted exit temperature $T_E$ being less than the required exit temperature $T_{ES}$ of the steam at the at least one steam drain valve (e.g., DV1), i.e., NO at process P20, controller 200 continues the preheating by maintaining the various valves in the same position, allowing the steam to continue to heat the part of conduit 104 upstream of first control valve CV1 and first steam drain valve DV1.

In contrast, in response to the predicted exit temperature $T_{ES}$ of the steam downstream of the at least one steam drain valve (e.g., DV1) being greater than or equal to the required exit temperature $T_{RS}$ of the steam at the at least one steam drain valve, i.e., YES at process P20, controller 200 closes the at least one steam drain valve, e.g., first steam drain valve DV1, and opens the at least one control valve, e.g., first control valve CV1, at process P24, to allow steam to flow downstream in conduit 104, e.g., toward steam manifold 106 and/or combustor 101. Second control valve CV2 and second steam drain valve DV2 are closed, and one of gas drain valves DV3 (or DV4 if provided) is open. Hence, closing the at least one steam drain valve and opening the at least one control valve may include closing first drain valve DV1 and opening first control valve CV1 in response to predicted exit temperature $T_{ES}$ of the steam downstream of first steam drain valve DV1 being greater than or equal to required exit temperature $T_{RS}$ of the steam at first steam drain valve DV1. In this case, conduit 104, which is upstream of first control valve CV1 and first steam drain valve DV1, is considered to have been sufficiently preheated. As a result, another section of conduit downstream of first control valve CV1 can be preheated as steam begins to flow therein.

Figure 4:
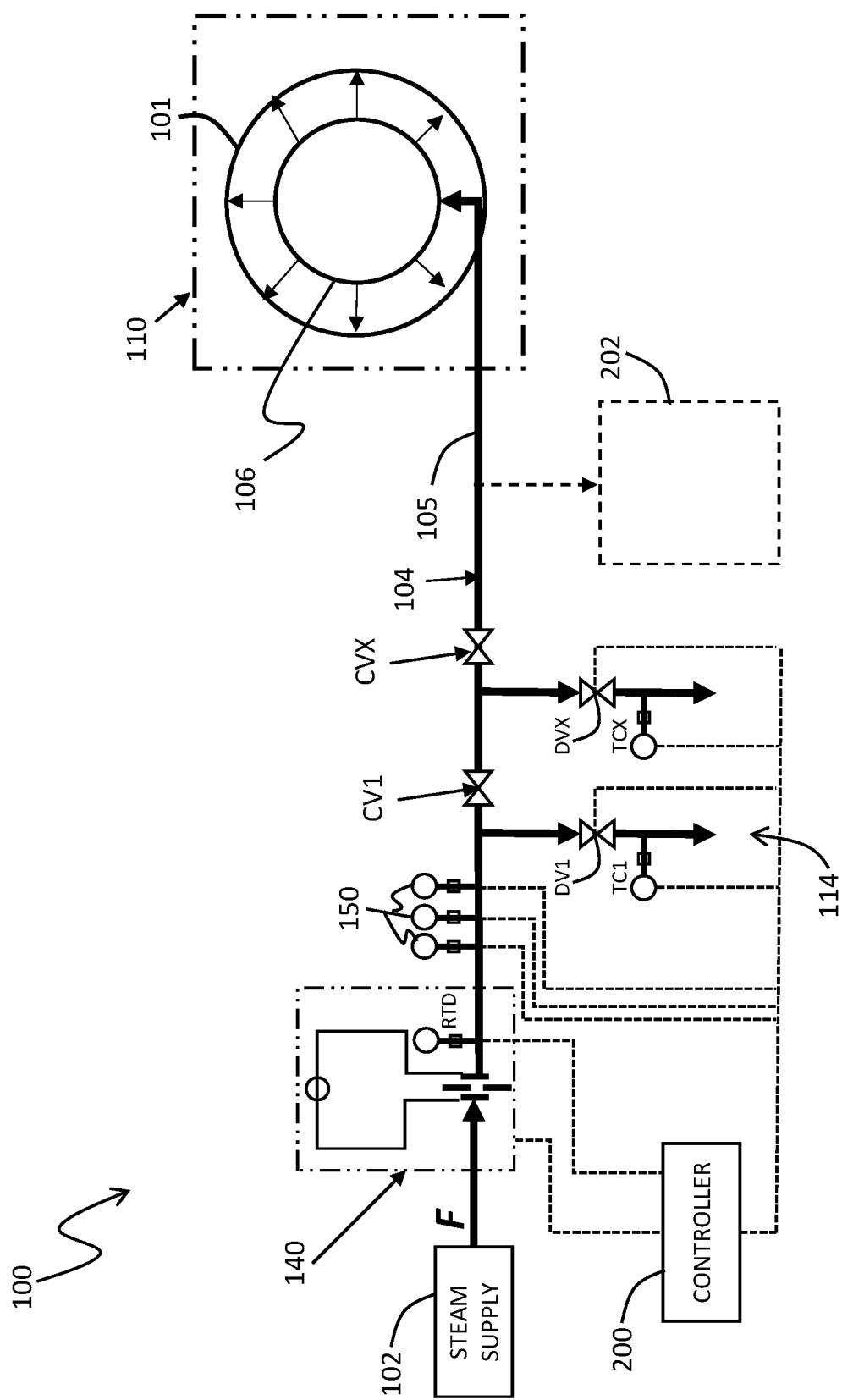
FIG. 4 shows a schematic view of a steam delivery system employing a system for preheating a conduit preheating control system, according to other embodiments of the disclosure.

Preheating sufficiency of a next downstream section of conduit 104 may be considered next. It will be recognized that any number of control valve and steam drain valve (and drain conduit) combinations (like first control valve CV1, steam drain valve DV1 and corresponding drain conduit 114) can be provided in sequence in conduit 104 to allow for checking of adequate preheating of sequential sections of conduit 104 by steam, i.e., repeating steps P20-P24 for each set of control valves, steam drain valves and drain conduits. FIG. 4 shows a simplified system 100 including one or more additional sets of control valves and steam drain valves (and drain conduits) that may operate in a similar manner to that just described. (Note, FIG. 4 illustrates gas drain valve(s) DV3, DV4, etc. as in FIG. 1, where gas backfills conduit 104, as a dashed box 202 for clarity, but this arrangement could also include any number of gas drain valves).

Referring again to FIG. 1 and also to FIG. 3B, as previously described, conduit 104 may include a region that is backfilled with a gas from combustor 101, e.g., compressed air, that may also preheat conduit 104 and that drains through gas drain valves DV3 and optionally DV4. Where gas is also backfilling conduit 104, the at least one control valve of system 100 may include first control valve CV1 and second control valve CV2 spaced from first control valve CV1 in conduit 104. Second control valve CV2 is a downstream-most valve that controls steam flow to combustor 101. As shown in FIG. 4, any number of upstream sets of control valve/drain valves may be used upstream of a downstream-most control valve ("CVX"). As noted, second control valve CV2 can be a modulated or on/off valve. Also, the at least one steam drain valve of system 100 may include first steam drain valve DV1 upstream of first control valve CV1 and also second steam drain valve DV2 (e.g., "DVX") upstream of second control valve CV2 (shown in FIG. 4 as the downstream-most control valve CVX). As described relative to FIG. 3A and processes P20-P24, closing the at least one steam drain valve and opening the at least one control valve includes closing first drain valve DV1 and opening first control valve CV1 in response to the predicted exit temperature of the steam downstream of first steam drain valve DV1 being greater than or equal to the required exit temperature of the steam at first steam drain valve DV1.

Where gas backfills conduit 104 from a downstream gas source to second control valve CV2 and drains from at least one gas drain valve (e.g., gas drain valve DV3 (and perhaps DV4)), the preheating control process may further include the processes shown in FIG. 3B. More particularly, in process P30, controller 200 calculates a predicted exit temperature $T_{ES}$ at second steam drain valve DV2 using the linear regression model based on initial temperature $T_i$, initial pressure $P_i$ and the Joule-Thompson cooling effect analysis of the steam at second steam drain valve DV2. Further, in process P32, controller 200 calculates a predicted exit temperature $T_{EG}$ of the gas downstream of first gas drain valve DV3 using the linear regression model based on initial temperature $T_i$, initial pressure $P_i$ and a Joule-Thompson cooling effect analysis of the gas at first gas drain valve DV3.

In process P34, controller 200 determines whether predicted exit temperature $T_{ES}$ of the steam downstream of second steam drain valve DV2 is greater than or equal to (≥) a required exit temperature $T_{RS}$ of the steam at second steam drain valve DV2 and whether predicted exit temperature $T_{EG}$ of the gas downstream of at least one gas drain valve, e.g., first gas drain valve DV3, is greater than a required exit temperature $T_{RG}$ of the gas at the at least one gas drain valve, e.g., DV3.

In process P36, in response to predicted exit temperature $T_{ES}$ of the steam downstream of second steam drain valve DV2 being less than required exit temperature $T_{RS}$ of the steam at second steam drain valve DV2 or predicted exit temperature $T_{EG}$ of the gas downstream of first gas drain valve DV3 being less required exit temperature $T_{RG}$ of the gas at first gas drain valve DV3, i.e., NO at process P34, controller 200 continues the preheating by maintaining the various valves in the same position. This arrangement allows the steam to continue to heat the part of conduit 104 upstream of second control valve CV2 and second steam drain valve DV2 and the gas to continue to heat the part of conduit 104 between the combustor and first gas drain valve DV3.

In contrast, in response to predicted exit temperature $T_{ES}$ of the steam downstream of second steam drain valve DV2 being greater than required exit temperature $T_{RS}$ of the steam at second steam drain valve DV2 and predicted exit temperature $T_{EG}$ of the gas downstream of first gas drain valve, e.g., DV3, being greater than required exit temperature $T_{RG}$ of the gas at first gas drain valve, e.g., DV3, i.e., YES at process P34, controller 200 stops the preheating in process P38. To stop the preheating, controller 200 closes second steam drain valve DV2 and first gas drain valve, e.g., DV3, and opens second control valve CV2. First control valve CV1 is open and first steam drain valve DV1 is closed. In this manner, steam and gas flows can no longer exit through drain valves DV1-DV3 and steam only flows through main steam conduit 105 to, for example, steam manifold 106 and/or combustor 101, stopping any preheating and placing conduit 104 in an operational state in which it delivers steam to its intended destination.

Also, in process P38, controller 200 may update the linear regression model, as described herein.

In process P39, controller 200 may optionally confirm preheating should be complete by determining whether actual exit temperatures of the steam downstream of the at least one steam drain valve, DV1, DV2 is sufficiently high. For example, controller 200 may determine whether actual exit temperatures of the steam downstream of the at least one steam drain valve DV1, DV2 are less than required exit temperature $T_{ES}$ of the steam at the respective steam drain valve DV1 or DV2 and may provide additional heat to conduit 104 if either is true. The actual exit temperatures $T_{TC}$ may be obtained from thermocouples TC1-TC3 and optionally TC4. Controller 200 can take a variety of actions if it determines that additional heat is required in conduit 104. For example, controller 200 may open at least one steam drain valve DV1 and/or DV2, leaving at least one control valve CV1 and/or CV2 closed, to provide additional heat to one or more sections of conduit 104 as it drains from steam drain valve(s) DV1, DV2. The duration of this process can be controlled by a timer. Other options to increase heating are also possible, e.g., increasing steam temperature within hardware integrity and/or other operational limitations.

As noted, in optional embodiments, system 100 may include more than one gas drain valve such as first gas drain valve DV3 and second gas drain valve DV4. FIG. 3C shows an embodiment of the method, which is similar to FIG. 3B, but also uses a predicted exit temperature of gas $T_{EG}$ at second gas drain valve DV4 to ensure preheating is sufficient. Processes P40 and P42 are identical to processes P30 and P32 in FIG. 3B. In process P44, controller 200 calculates a predicted exit temperature $T_{EG}$ of the gas downstream of second gas drain valve DV4 using the linear regression model based on initial temperature $T_i$, initial pressure $P_i$ and a Joule-Thompson cooling effect analysis of the gas at second gas drain valve DV4.

In process P46, controller 200 determines whether: a) predicted exit temperature $T_{ES}$ of the steam downstream of second steam drain valve DV2 is greater than or equal to (≥) a required exit temperature $T_{RS}$ of the steam at second steam drain valve DV2, and b) predicted exit temperature $T_{EG}$ of the gas downstream of first gas drain valve DV3 is greater than a required exit temperature $T_{RG}$ of the gas at first gas drain valve DV3, and c) predicted exit temperature $T_{EG}$ of the gas downstream of second gas drain valve DV4 is greater than a required exit temperature $T_{RG}$ of the gas at second gas drain valve DV4.

In process P48, in response to: a) predicted exit temperature $T_{ES}$ of the steam downstream of second steam drain valve DV2 being less than required exit temperature $T_{RS}$ of the steam at second steam drain valve DV2, or b) predicted exit temperature $T_{EG}$ of the gas downstream of first gas drain valve DV3 being less required exit temperature $T_{RG}$ of the gas at first gas drain valve, or c) predicted exit temperature $T_{EG}$ of the gas downstream of second gas drain valve DV4 being less required exit temperature $T_{RG}$ of the gas at second gas drain valve DV4, i.e., NO at process P46, controller 200 continues the preheating by maintaining the various valves in the same position. This arrangement allows the steam to continue to heat the part of conduit 104 upstream of second control valve CV2 and second steam drain valve DV2 and the gas to continue to heat the part of conduit 104 between combustor 101 and second control valve CV2.

In contrast, in response to: a) predicted exit temperature $T_{ES}$ of the steam downstream of second steam drain valve DV2 being greater than required exit temperature $T_{RS}$ of the steam at second steam drain valve DV2, and b) predicted exit temperature $T_{EG}$ of the gas downstream of first gas drain valve DV3 being greater than required exit temperature $T_{RG}$ of the gas at first gas drain valve DV3, and c) predicted exit temperature $T_{EG}$ of the gas downstream of second gas drain valve DV4 being greater than required exit temperature $T_{RG}$ of the gas at second gas drain valve DV4, i.e., YES at process P46, controller 200 stops the preheating in process P50. To stop the preheating, controller 200 closes second steam drain valve DV2 and both gas drain valves DV3, DV4, and opens second control valve CV2. First control valve CV1 is open and first steam drain valve DV1 is closed. In this manner, steam and gas flows can no longer exit through drain valves DV1-DV4 and steam only flows through main steam conduit 105 downstream to, e.g., steam manifold 106 and/or combustor 101, stopping any preheating and placing conduit 104 in an operational state in which it delivers steam to its destination, e.g., combustor 101 or other equipment.

Also, in process P50, controller 200 may update the linear regression model, as described herein.

In process P52, controller 200 may optionally confirm preheating should be complete by confirming actual exit temperatures of the steam downstream of the at least one steam drain valve, DV1, DV2, are less than required exit temperature $T_{RS}$ of the steam at the respective steam drain valve DV1 or DV2. The actual exit temperatures $T_{TC}$ may be obtained from thermocouples TC1-TC3 and optionally TC4. Controller 200 can take a variety of actions if it determines that preheating should be restarted. For example, controller 200 may open at least one steam drain valve DV1 and/or DV2 and/or close at least one control valve CV1 and/or CV2 to prevent steam flowing downstream in conduit 104 toward combustor 101, and thus provide additional heat to one or more sections of conduit 104.

Embodiments of the disclosure provide various technical and commercial advantages, examples of which are discussed herein. As embodied by the disclosure, the system provides more accurate control of conduit preheating by predicting exit temperatures at drain valves based on the Joule-Thompson effect rather than just relying on measured exit temperatures. In this manner, the system considers different variables that impact the preheating and is not overly protective to the extent that the system expends more energy and time in the preheating process than is actually required. The system thus reduces unnecessary downtime of the system and advantageously uses the steam for power augmentation in the gas turbine. The system and method may be applied to any turbomachine equipped with the system.

As will be appreciated by one skilled in the art, the teachings of the disclosure may be embodied as a system, method, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."Furthermore, the present disclosure may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object-oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described below with reference to flow diagram illustrations and/or block diagrams of methods, apparatus (systems) and computer program products according to embodiments of the disclosure. It will be understood that each block of the flow diagram illustrations and/or block diagrams, and combinations of blocks in the flow diagram illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagram and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flow diagram and/or block diagram block or blocks.

The drawings illustrate the architecture, functionality, and operation of possible implementations of systems, methods, and computer program products according to various embodiments of the present disclosure. In this regard, each block in the flow diagram or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow diagram illustration, and combinations of blocks in the block diagrams and/or flow diagram illustration, can be implemented by special purpose hardware-based systems that perform the specified functions or acts, or combinations of special purpose hardware and computer instructions.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately," as applied to a particular value of a range, applies to both end values and, unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application and to enable others of ordinary skill in the art to understand the disclosure for various embodiments with various modifications as are suited to the particular use contemplated.

What is claimed is:

1. A method for controlling preheating of a conduit, the method comprising:
    preheating the conduit by flowing a steam through the conduit to preheat the conduit with at least one control valve closed to prevent steam downstream flow and at least one steam drain valve open;
    determining an initial temperature and an initial pressure of the steam upstream of the at least one control valve and the at least one steam drain valve;
    calculating a predicted exit temperature of the steam downstream of the at least one steam drain valve using a linear regression model based on the initial temperature, the initial pressure and a Joule-Thompson cooling effect analysis of the steam at the at least one steam drain valve;
    in response to the predicted exit temperature of the steam downstream of the at least one steam drain valve being greater than or equal to a required exit temperature of the steam at the at least one steam drain valve, closing the at least one steam drain valve and opening the at least one control valve to allow steam to flow downstream in the conduit; and
    in response to the predicted exit temperature being less than the required exit temperature of the steam at the at least one steam drain valve, continuing the preheating.

2. The method of claim 1, wherein the at least one control valve includes a first control valve and a second control valve spaced from the first control valve in the conduit, and the at least one steam drain valve includes a first steam drain valve upstream of the first control valve and a second steam drain valve downstream of the first control valve and upstream of the second control valve, and
    wherein the closing the at least one steam drain valve and opening the at least one control valve includes closing the first steam drain valve and opening the first control valve in response to the predicted exit temperature of the steam downstream of the first steam drain valve being greater than or equal to the required exit temperature of the steam at the first steam drain valve.

3. The method of claim 2, wherein the second control valve includes a stop valve.

4. The method of claim 2, further comprising at least one gas drain valve downstream of the second control valve, and wherein, during the preheating, a gas backfills the conduit from a downstream gas source to the second control valve and drains from the at least one gas drain valve, and
    further comprising calculating a predicted exit temperature of the gas downstream of the at least one gas drain valve using the linear regression model based on the initial temperature, the initial pressure and a Joule-Thompson cooling effect analysis of the gas at the at least one gas drain valve,
    further comprising stopping the preheating by closing the second steam drain valve and the at least one gas drain valve and opening the second control valve in response to:
        the predicted exit temperature of the steam downstream of the second steam drain valve being greater than the required exit temperature of the steam at the second steam drain valve, and
        the predicted exit temperature of the gas downstream of the at least one gas drain valve being greater than a required exit temperature of the gas at the at least one gas drain valve.

5. The method of claim 4, wherein the at least one gas drain valve includes a first gas drain valve and a second gas drain valve, and the stopping the preheating occurs in response to:
    the predicted exit temperature of the gas downstream of the first gas drain valve being greater than a required exit temperature of the gas at the first gas drain valve, and the predicted exit temperature of the gas downstream of the second gas drain valve being greater than a required exit temperature of the gas at the second gas drain valve.

6. The method of claim 1, further comprising in response to an actual exit temperature of the steam downstream of the at least one steam drain valve being less than the required exit temperature of the steam at the at least one steam drain valve, opening the at least one steam drain valve and closing the at least one control valve to prevent steam flowing downstream in the conduit.

7. A system for controlling preheating of a conduit, the system comprising:
 a steam supply fluidly coupled to the conduit;
 at least one control valve in the conduit;
 at least one steam drain valve configured to drain steam from the conduit upstream of the at least one control valve;
 at least one upstream thermocouple disposed upstream of the at least one control valve and the at least one steam drain valve; and
 a controller configured to:
  preheat the conduit by flowing the steam from the steam supply through the conduit with the at least one control valve closed to prevent downstream steam flow and the at least one steam drain valve open;
  determine an initial temperature and an initial pressure of the steam upstream of the at least one control valve and the at least one steam drain valve using the at least one thermocouple;
  calculate a predicted exit temperature of the steam downstream of the at least one steam drain valve using a linear regression model based on the initial temperature, the initial pressure, and a Joule-Thompson cooling effect analysis of the steam at the at least one steam drain valve;
  in response to the predicted exit temperature of the steam downstream of the at least one steam drain valve being greater than or equal to a required exit temperature of the steam at the at least one steam drain valve, close the at least one steam drain valve and open the at least one control valve to allow steam to flow downstream in the conduit; and
  in response to the predicted exit temperature being less than the required exit temperature of the steam at the at least one steam drain valve, continue the preheating.

8. The system of claim 7, wherein the at least one control valve includes a first control valve and a second control valve spaced from the first control valve in the conduit, and the at least one steam drain valve includes a first steam drain valve upstream of the first control valve and a second steam drain valve downstream of the first control valve and upstream of the second control valve, and
 wherein the controller closes the first drain valve and opens the first control valve in response to the predicted exit temperature of the steam downstream of the first steam drain valve being greater than or equal to the required exit temperature of the steam at the first steam drain valve.

9. The system of claim 8, wherein the second control valve includes a stop valve.

10. The system of claim 8, further comprising at least one gas drain valve downstream of the second control valve, and wherein, during the preheating, a gas backfills the conduit from a downstream gas source to the second control valve and drains from the at least one gas drain valve, and
 wherein the controller:
  calculates a predicted exit temperature of the gas downstream of the at least one gas drain valve using the linear regression model based on the initial temperature, the initial pressure and a Joule-Thompson cooling effect analysis of the gas at the at least one gas drain valve; and
  stops the preheating by closing the second steam drain valve and the at least one gas drain valve and opening the second control valve in response to:
   the predicted exit temperature of the steam downstream of the second steam drain valve being greater than the required exit temperature of the steam at the second steam drain valve; and
   the predicted exit temperature of the gas downstream of the at least one gas drain valve being greater than a required exit temperature of the gas at the at least one gas drain valve.

11. The system of claim 10, wherein the at least one gas drain valve includes a first gas drain valve and a second gas drain valve, and wherein the controller stops the preheating in response to:
 the predicted exit temperature of the gas downstream of the first gas drain valve being greater than a required exit temperature of the gas at the first gas drain valve, and
 the predicted exit temperature of the gas downstream of the second gas drain valve being greater than a required exit temperature of the gas at the second gas drain valve.

12. The system of claim 8, further comprising a downstream thermocouple disposed downstream of the at least one steam drain valve, and wherein the controller in response to an actual exit temperature of the steam downstream of the at least one steam drain valve measured by the downstream thermocouple being less than the required exit temperature of the steam at the at least one steam drain valve, opening the at least one steam drain valve and closing the at least one control valve to prevent steam flowing downstream in the conduit.

13. A system for controlling preheating of a conduit, the system comprising:
 a steam supply fluidly coupled to the conduit, wherein a gas backfills the conduit from a downstream gas source;
 a first control valve in the conduit;
 a first steam drain valve configured to drain steam from the conduit upstream of the first control valve;
 a second control valve in the conduit downstream of the first control valve;
 a second steam drain valve configured to drain steam from the conduit downstream of the first control valve and upstream of the second control valve;
 at least one gas drain valve in the conduit downstream of the second control valve;
 at least one sensor upstream of the first and second control valves and the first and second steam drain valves to provide an initial temperature and an initial pressure of the steam entering the conduit; and
 a controller configured to:
  preheat the conduit by flowing the steam through the conduit with the first control valve closed to prevent downstream steam flow and the first steam drain valve open;

in response to a predicted exit temperature of the steam downstream of the first steam drain valve being less than the required exit temperature of the steam at the first drain valve, continue the preheating;

in response to the predicted exit temperature of the steam downstream of the first steam drain valve being greater than or equal to the required exit temperature of the steam at the first steam drain valve, close the first steam drain valve and open the first control valve to allow steam to flow downstream in the conduit, and subsequently:

stop the preheating by closing the second steam drain valve and opening the second control valve in response to a predicted exit temperature of the steam downstream of the second steam drain valve being greater than the required exit temperature of the steam at the second steam drain valve, and a predicted exit temperature of the gas downstream of the at least one gas drain valve being greater than a required exit temperature of the gas at the at least one gas drain valve, and wherein each predicted exit temperature of the steam or the gas downstream of a respective drain valve is calculated using a linear regression model based on the initial temperature, the initial pressure and a Joule-Thompson cooling effect analysis of the steam or the gas at the respective drain valve.

14. The system of claim 13, wherein the second control valve includes a stop valve.

15. The system of claim 13, wherein the at least one gas drain valve includes a first gas drain valve and a second gas drain valve, and wherein the controller stops the preheating in response to:

the predicted exit temperature of the gas downstream of the first gas drain valve being greater than the required exit temperature of the gas at the first gas drain valve, and the predicted exit temperature of the gas downstream of the second gas drain valve being greater than the required exit temperature of the gas at the second gas drain valve.

* * * * *